United States Patent [19]
Turkish

[11] B 3,985,111
[45] Oct. 12, 1976

[54] ARTICLE FOR DEFINING AN AUXILIARY COMPARTMENT FOR AN ENGINE COMBUSTION CHAMBER

[75] Inventor: Michael C. Turkish, Lyndhurst, Ohio

[73] Assignee: Eaton Corporation, Cleveland, Ohio

[22] Filed: Dec. 17, 1973

[21] Appl. No.: 425,588

[44] Published under the second Trial Voluntary Protest Program on January 13, 1976 as document No. B 425,588.

[52] U.S. Cl. ............... 123/325 T; 123/325 P; 123/75 B; 123/DIG. 4; 123/191 S
[51] Int. Cl.[2] .................................. F02B 19/10
[58] Field of Search.......... 123/30 A, 325 P, 325 T, 123/325 A, 32 K, 75 B, DIG. 4, 191 S, 191 SP, 32 AA

[56] References Cited
UNITED STATES PATENTS

| | | | |
|---|---|---|---|
| 1,662,989 | 3/1928 | Stroud | 123/32 AA |
| 1,926,499 | 9/1933 | Ricardo | 123/75 B |
| 2,000,903 | 5/1935 | Lehmann | 123/30 A |
| 2,066,228 | 12/1936 | Ricardo | 123/30 B |
| 2,983,268 | 5/1961 | Heintz | 123/30 C |
| 2,991,768 | 7/1961 | Witzky | 123/32 B |
| 3,058,452 | 10/1962 | Espenshied | 123/325 P |
| 3,105,470 | 10/1963 | Hockel et al. | 123/325 P |
| 3,111,117 | 11/1963 | Gotz | 123/30 C |
| 3,799,140 | 3/1974 | Vogelsang et al. | 123/191 S |

FOREIGN PATENTS OR APPLICATIONS

| | | | |
|---|---|---|---|
| 363,516 | 12/1931 | United Kingdom | 123/32 A |

Primary Examiner—Charles J. Myhre
Assistant Examiner—William C. Anderson
Attorney, Agent, or Firm—Teagno & Toddy

[57] ABSTRACT

An article for defining an auxiliary compartment for providing accelerated initial warm-up of the combustion chamber of an internal combustion engine, and thereafter providing for continuous transfer of heat to the walls of the combustion chamber to prevent overheating of the article. The article has a central tubular heat-receiving portion with one end closed and the opposite end open in a generally cup-shaped configuration with a mounting flange provided around the rim of the open end, and a heat output portion of preferably annular configuration provided around the outer periphery of the closed end region. An aperture is provided in the closed end for communicating the interior region of the central portion with the engine combustion chamber. In one embodiment the article is sized and shaped such that the heat output portion is in contact with adjacent portions of the combustion chamber wall to provide continuous transfer of heat from the closed end of the cup to the combustion chamber. In another embodiment the article is shaped and sized such that the heat output portion is initially spaced from the combustion chamber walls. Upon heating of the central portion of the article to a predetermined temperature, the article expands and the heat output portion contacts the combustion chamber wall to thereafter provide continuous heat transfer thereto. The method of preheating includes electrically insulating the mounting flange and grounding the heat output portion and passing an electrical current through the article to cause resistance heating thereof.

26 Claims, 5 Drawing Figures

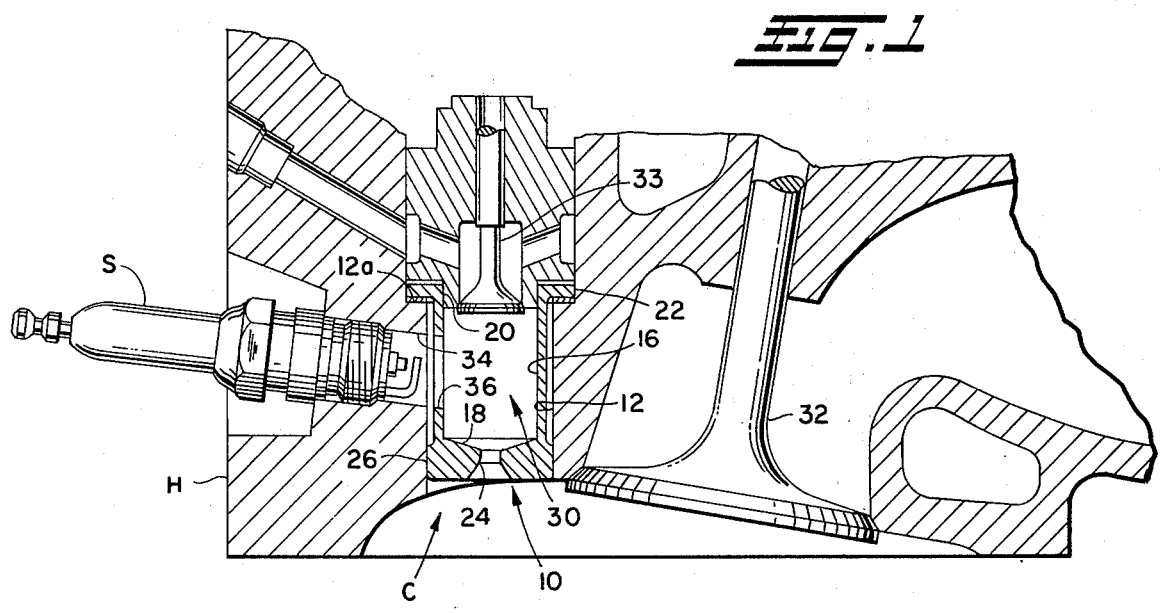
Fig. 1
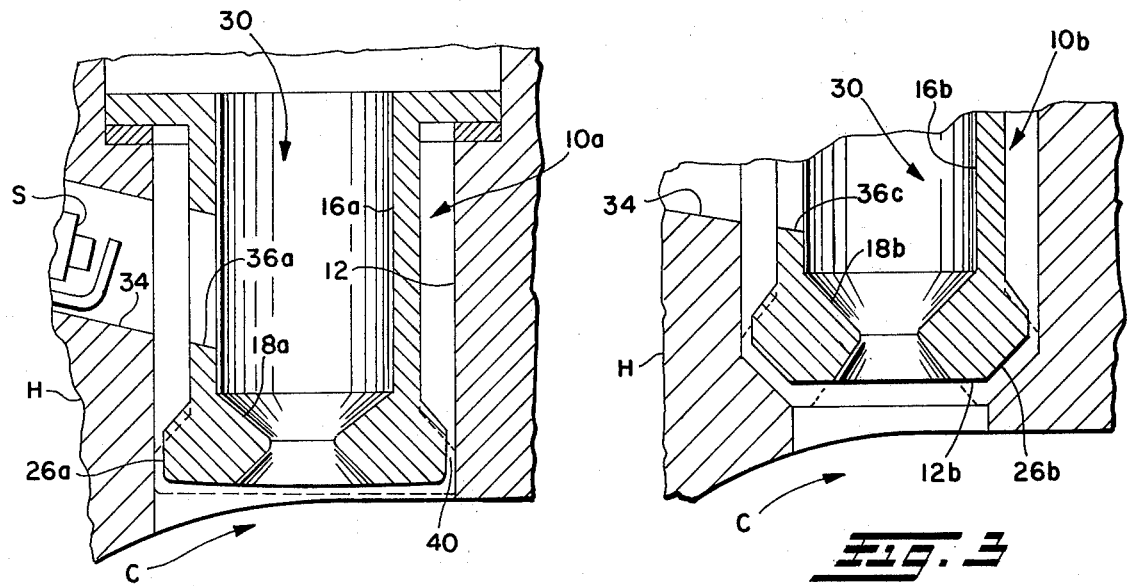
Fig. 2
Fig. 3
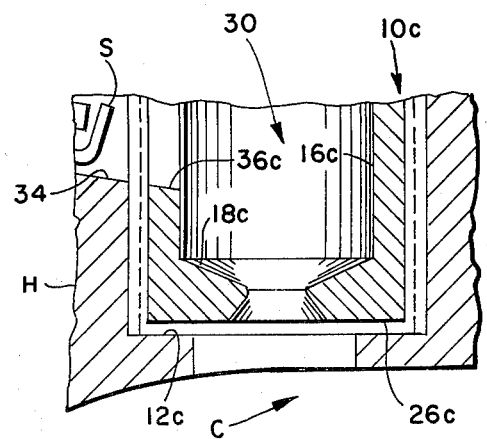
Fig. 4

ARTICLE FOR DEFINING AN AUXILIARY COMPARTMENT FOR AN ENGINE COMBUSTION CHAMBER

BACKGROUND OF THE INVENTION

Recent efforts to reduce the exhaust emissions of internal combustion engines, particularly those of the reciprocating type, have involved staging the combustion for each power cycle of the engine.

It has been found desirable to use a lean mixture in the main combustion chamber in order to provide fewer undesirable by-products of combustion or harmful emissions as they are generally known as, for example, oxides of nitrogen and unburned hydrocarbons.

The most critical period of operation of an internal combustion engine with respect to exhaust emissions is that period following first firing when the engine is started from a cold condition. The cold portions of the cylinder wall and cylinder head cause condensation of the fuel mixture, and further cause undesirable quenching of the burning of the hot gases. When the engine has been operating for a period of time and/or under a sufficient load that it is brought to its normal operating temperature, the combustion of hot gases becomes more efficient and the problem of exhaust emissions is greatly reduced. Therefore it has been found desirable to provide some means of accelerating the initial heating or warm-up of the combustion chamber of the engine when it is started from the cold condition. It has been found that providing two-stage ignition of the fuel charge produces a rapid warm-up effect in a cold combustion chamber and minimizes the exhaust emissions during engine warm up.

More particularly, with regard to reciprocating engines of the spark-ignition type, it has been discovered and it is known in the art that, if a separate, auxiliary, compartment is provided within the combustion chamber and a rich fuel mixture provided within the separate chamber, ignition of the rich mixture may be used to ignite a lean mixture in the main compartment of the combustion chamber. This particular type of two-stage fuel burning is referred to as "pre-chamber" or "stratified-charge" combustion. See, for example, the published German patent specifications No. 2,301,066, 2,259,286 and 2,302,051 published July 26, Aug. 2, and Aug. 29, 1973, respectively.

In the stratified-charge type combustion, a separate auxiliary compartment or pre-chamber is charged at the appropriate time during each cycle, with a very rich mixture of fuel which is then ignited by a conventional spark ignition device. The hot gases from the burning of the rich mixture in the pre-chamber are channeled through passages in the pre-chamber to the main compartment of the combustion chamber, and these hot gases serve as a torch to ignite a lean mixture in the main chamber. This manner of combustion has been a satisfactory solution to the problem of directly spark-igniting a lean mixture in the main combustion chamber.

Previous attempts to provide an auxiliary compartment or pre-chamber in the main combustion chamber of an internal combustion engine have generally used the technique of providing a cup-shaped or hollow tubular insert extending into the main combustion chamber from the cylinder head of the engine.

The pre-chamber is thus formed by the interior of the cup-shaped or tubular member and desired ports are provided in the wall of the cup-shaped member for communication of the interior of the pre-chamber with the spark-igniting means and for communication of the hot gases from the pre-chamber with the fuel mixture in the main combustion chamber. The cup-shaped member is thus usually attached by the open end thereof to the wall of the combustion chamber as, for example, to a portion of the cylinder head of the engine. The rich fuel charge for the pre-chamber may then be supplied to the pre-chamber through the open end of the cup-shaped member attached to the cylinder head by porting the cylinder head to the cup-shaped member. This arrangement has been found desirable because it permits the addition of a pre-chamber to existing cylinder heads without complete redesign on the cylinder head, and also lends itself to economical manufacturing techniques.

In order for the cup to serve its function of rapidly heating the gases in the main combustion chamber upon cold starting, it has been proposed that the cup be made of a material having a high thermal conductivity. However, the pre-chamber cup is exposed to the hot gases of the main combustion chamber, and therefore must have very good oxidation resistance at elevated temperatures and particularly temperatures of up to 850° C. Unfortunately, materials having a desirable high coefficient of thermal conductivity do not provide sufficient oxidation resistance at these elevated temperatures. Furthermore, the materials that have the desired oxidation resistance do not have sufficient thermal conductivity to permit cantilever mounting of the cup from a mounting flange provided on the open end. If such a configuration for a pre-chamber cup is employed using any of these materials, upon the engine's reaching operating temperature, the pre-chamber cup is unable to transfer heat along its length and through the mounting flange to the cylinder head at a sufficiently rapid rate, and the cup suffers destructive overheating in the region of the closed end.

It has therefore been desirable to provide an article for defining a pre-chamber for an internal combustion engine which initially heats rapidly from the burning of the mixture in the pre-chamber yet one which, upon reaching normal operating temperature, maintains a sufficient rate of heat transfer to the engine to prevent overheating of the cup. Such a cup must also have sufficient oxidation resistance when exposed to the gaseous combustion products at normal combustion chamber operating temperatures, to withstand the corrosive attack of the hot combustion gases.

SUMMARY OF THE INVENTION

The present invention provides a solution to the problem of providing an article for defining an auxiliary chamber, or pre-chamber, for the combustion chamber of an internal combustion engine for enabling rapid initial warm-up. The article of the present invention is formed of corrosion-resistant metal having suitable oxidation resistance to withstand the corrosive attack of hot combustion gases. The article of the present invention is formed having a tubular central heat-receiving portion with one end closed and the opposite end open to thereby have a generally cup-shaped configuration. The article has a mounting flange provided around the rim of the open end for attachment of the article by the mounting flange in a cantilever manner in a cavity formed in the walls of a combustion chamber of an engine. The cupped or generally closed end of the cup has an aperture provided therein for providing communication of the interior region of the central portion with a combustion chamber of the engine. The closed end includes a preferably annular heat output portion formed on the outer periphery of the central portion adjacent the closed end. The heat output portion in one embodiment is pressfitted and initially in contact with the walls of the combustion chamber to provide heat transfer from the cupped end of the article to the combustion chamber walls. In another embodiment of the invention, the article has a size and shape such that the heat output portion is initially spaced from the adjacent walls of the engine combustion chamber and, upon heating of the central portion to a predetermined temperature and expansion of the article, the heat output portion contacts the adjacent walls of the combustion chamber to thereafter provide continuous heat transfer from the cupped end of the cup to the combustion chamber walls.

The method of the present invention provides for insulating electrically the mounting flange of the article from the combustion chamber and utilizing the initial contact of the heat output portion of the article with the combustion chamber to enable passage of an electric current from the mounting flange to the heat output portion to provide resistance heating of the article throughout its length.

The present invention thus provides an article having oxidation resistance at elevated temperatures and one which lends itself to rapid initial warm-up and subsequent continuous heat transfer to prevent overheating of the prechamber during engine operation.

BRIEF DESCRIPTION OF THE DRAWINGS

FIG. 1 is a cross section of a portion of the combustion chamber of an internal combustion engine illustrating the invention in the preferred form in which the heat output portion of the cup adjacent the end remote from the mounting flange is in continuous contact with the engine combustion chamber.

FIG. 2 is a fragmentary sectional view of another embodiment of the article of FIG. 1.

FIG. 3 is a view similar to FIG. 2 and shows another embodiment of the article of FIG. 1.

FIG. 4 is a view similar to FIG. 2 and shows another variation of the embodiment of FIG. 1.

Referring now to FIG. 1 of the drawings, the article 10 is shown disposed within the combustion chamber C of an internal combustion engine. The wall of the combustion chamber C is formed by the cylinder head H. A cavity 12 is formed in the wall of the cylinder head for receiving the article 10.

Figure 5:
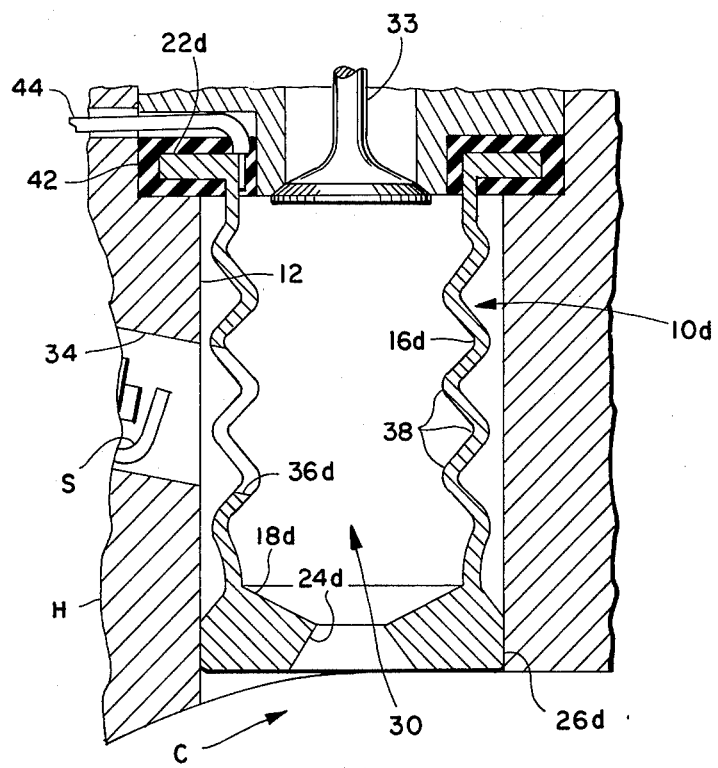
FIG. 5 is a view similar to FIG. 1 and illustrates another embodiment of the invention employing an optional method of pre-heating the article.

The article of the present invention is shaped so as to be disposed in closely fitting, generally spaced, relationship to the cavity 12 provided in the cylinder head. The article 10 of the present invention has a central tubular portion 16 with a cupped or generally closed end 18 and an open end 20, and thus has a generally cup-shaped configuration. Mounting flange 22 is provided around the rim of the open end 20 which mounting flange 22 has a generally annular configuration and extends preferably radially outwardly from the central tubular portion 16. The cupped or generally closed end 18 of the article has an aperture 24 provided therein which will be hereinafter described in greater detail. A heat output portion 26 is provided around the outer periphery of the central tubular portion 16, which heat output portion 26 is disposed adjacent the region of the closed end 18 of the article. The heat output portion has a generally annular configuration and preferably extends radially outwardly from the outer periphery of the central tubular portion.

The article 10 is received in the cavity 12 in the cylinder head and is secured therein by attachment of the mounting flange 22 to a counterbore 12a provided in the cylinder head cavity. The heat output portion 26 has a diameter such that an interference, or press fit, is provided between the heat output portion 26 and the cavity 12 in the cylinder head, such that the heat output portion 26 is initially in direct contact with the surface of the cavity 12. This arrangement provides for an annular space between the outer periphery of the central tubular portion 16 and the surface of the cavity 12 in the cylinder head in the region intermediate the ends of the article.

As described above, the closed end of the article has an aperture 24 formed therein. The aperture provides for communication between the interior region of the central portion 16 and the combustion chamber C of the engine. Thus, the interior region of the central tubular portion 16, in cooperation with the closed end 18 of the article, defines an auxiliary chamber 30 within the combustion chamber C of the engine. The aperture 24 in the preferred practice of the invention has the periphery thereof shaped so as to provide a converging-diverging nozzle.

The article of the present invention is disposed in cavity 12 and is preferably arranged such that the open end 20 of the article 10 communicates with an auxiliary or second intake valve 33 provided in the cylinder head of the engine for permitting introduction of a fuel charge to the auxiliary chamber 30 separately from the charge to the main combustion chamber C. The main combustion chamber C receives its fuel charge in the conventional manner from the usual intake valve 32 which may be operated in the conventional manner well known in the art. The arrangement of the article of the present invention as shown in FIG. 1 thus provides for chemical stratification of the combustion charge to the engine.

The cavity 12 has a port 34 provided in the wall thereof which port has an igniting means such as a spark plug S received therein or a glow plug (not shown). The article 10 of the present invention has a second aperture 36 provided in the wall of the central portion 16 which aperture 36 is disposed in alignment with the port 34 so as to provide communication between the spark plug S and the interior region of the central tubular portion 16.

In operation, a rich fuel charge is drawn into the auxiliary chamber 30 by opening of auxiliary valve 33 by appropriate valve gear (not shown) which may be of any type well known in the art. Alternatively, the rich charge may be directly injected into the auxiliary chamber 30. The rich charge is compressed after closing of valve 33 and a spark from plug S causes ignition of the charge within chamber 30. The burning mixture in chamber 30 torches out through nozzle 24 to ignite the lean mixture in combustion chamber C. It will be appreciated that, if desired, a plurality of apertures 24 may be provided.

In the preferred practice of the invention, the central tubular portion 16 of the article 10 has a thin wall as compared to the diameter thereof and has a radial wall thickness less than 3.0 millimeters and preferably in the range of 1.0 through 2.0 millimeters. This thin wall configuration provides for rapid heating of the central tubular portion 16 upon initial firing of the engine when starting from the cold condition.

The closed end portion 18 is provided with a heavier wall thickness than the central portion 16 such that the end portion 18 and the heat output portion 26 provide adequate heatsinking, or heat-transfer from the closed end of the article to the surface of the cavity 12 in the cylinder head. This arrangement of a heavier heat output portion on the closed end 18 permits the central tubular region 16 of the article to operate at higher temperatures than the closed end portion 18. In other words, the closed end 18 operates at a lower temperature than the central tubular portion 16 so as to prevent destructive overheating of the article 10.

Referring now to FIG. 2, an alternate embodiment of the article 10a is illustrated wherein the heat output portion 26a is provided on the outer periphery of the closed end portion 18a of the thin wall central heat-receiving portion 16a. The heat output portion 26a has the outer periphery thereof sized and shaped so as to initially provide an annular space 40 radially intermediate the wall of the cylinder head cavity 12 and the outer periphery of the heat output portion 26a.

The diameter of the outer periphery of the heat output portion 26a is designed by conventional techniques utilizing the known thermal expansion properties of the material in a manner well known to those having ordinary skill in the art. Upon heating of the article subsequent to initial firing of the engine when in a cold state, the article 10a expands such that the heat output portion 26a contacts the wall of the cavity 12 when the temperature of the central portion 16a reaches a value not greater than 350° C. As the article is heated to temperatures above the said predetermined value, the heat output portion 26a maintains contact with the wall 12 of the cylinder head cavity to thereby provide for continuous heat transfer from the closed end 18a of the cup to the wall cavity 12 in the cylinder head. Referring specifically to FIG. 2, the configuration of the article 10a in the cold condition is shown in solid outline and, in the expanded heat transfer condition, is shown in dashed outline.

The embodiment of FIG. 2 thus provides an article for defining an auxiliary chamber in the combustion chamber of an engine which may be assembled into the cavity 12 initially without the necessity of an interference or press fit. The embodiment of FIG. 2 provides for rapid heating of the central portion 16a of the cup. Upon heating and expansion of the central portion 16a, the heat output portion 26a expands and makes contact with the wall 12 of the cavity in the cylinder head, to thereafter provide an adequate rate of heat transfer for preventing overheating of the closed end 18 of the cup.

Referring now to FIG. 3, another embodiment is shown in which the article 10b has the heat output portion 26b provided on the outer periphery of the central tubular region 16b adjacent the closed end 18b. In the embodiment of FIG. 3 the heat output portion 26b is inclined at an acute angle to the axis of the tubular portion such that the heat output portion 26b defines a truncated conical surface. The embodiment of FIG. 3 requires that a corresponding conical shoulder 12b be provided in the wall of the cavity 12 in the cylinder head.

In the embodiment of FIG. 3 the article 10b is designed by utilizing conventional techniques known to those having ordinary skill in the art from the known expansion properties of the material. As the article 10b expands axially from absorbing heat during initial firing of the engine, the heat output surface 26b is wedged against the shoulder 12b when the central portion 16b reaches a predetermined temperature preferably not greater than 350° C. The wedging contact of the heat output portion 26b with shoulder 12b is maintained thereafter at temperatures above the predetermined value and thus provides a juncture for continuous heat transfer from the closed end 18b of the article to thereby prevent destructive overheating of the closed end 18b of the article.

Referring now to FIG. 4, another embodiment of the invention is illustrated in which an article 10c has a closed end 18c with a thin wall tubular central heat receiving portion 16c and a heat output portion 26c provided on the axially outer face of the closed end 18c. In the embodiment of FIG. 4, the heat output portion 26c is shaped so as to form a substantially right angle with the outer periphery of the central tubular portion 16c. The embodiment of FIG. 4 requires that the wall of the cavity 12 formed in the cylinder head be provided with a flat bottom counterbore surface 12c for engagement with the heat output portion 26c of the article 10c.

The embodiment of FIG. 4 thus employs an axial space between the heat output portion 26c of the article and the flat bottom surface 12c of the counterbore. In the preferred practice, the embodiment 10c of FIG. 4 is designed by utilizing techniques well known to those skilled in the art from the known thermal expansion properties of the material in order to establish the length of the article 10c such that the heat output surface 26c is initially axially spaced the desired amount from the counterbore surface 12c. Upon heating of the central portion 16c to a predetermined temperature preferably not greater than 350° C, the article 10c expands axially to cause the heat output surface 26c to engage the surface 12c of the flat bottom counterbore. The embodiment of FIG. 4 thus provides an alternative to that of FIG. 3 or FIG. 2.

The article of the present invention may be formed of any material having suitable oxidation resistance when exposed to the hot gaseous combustion products at normal operating temperatures within the engine combustion chamber. Preferably, the article 10, 10a, 10b, 10c and 10d is made of corrosion resistant metal selected from one of the AISI type 300 series stainless steels or from a chromium-nickel metal alloy. However, any material having suitable oxidation resistant properties at temperatures below 850° C may be used.

Referring now to FIG. 5, another embodiment 10d of the article of the present invention is shown installed in a cavity 12 formed in the cylinder head of an engine. The embodiment of FIG. 5 is similar to the arrangement of the embodiment of FIG. 1 in that the heat output surface 26d has an initial interference, or press fit, with the wall of the cavity 12 in the cylinder head. The embodiment of FIG. 5 employs axial convolutions 38 in the wall 16d of the tubular central portion of the article 10d. The convolutions 38 provide increased surface area to the central tubular region to enhance initial warm-up of the article 10d.

The embodiment of FIG. 5 also incorporates the method of preheating the article 10d before starting of the engine when in a cold condition. Referring specifically to FIG. 5, the mounting flange 22d has the outer surface thereof encased with electrical insulating material 42 so as to prevent direct contact of the mounting flange 22d with the wall of the cavity 12 in the cylinder head. An electrical conductor 44 is provided and is attached to the mounting flange 22d through insulation 42 in any convenient manner. The electrical conductor 44 is insulated and thus conducts only to flange 22d. This arrangement permits resistance heating of the article 10d by applying an electrical potential between the conductor 44 and the cylinder head H. Electrical current will thus flow from the conductor through the mounting flange 22d along the length of the article 10d and through the contact of heat output portion 26d to the cylinder head H, to thus permit resistance heating of the article 10d through its entire length.

It will be understood that, although the present invention has been described as embodied for use in defining an auxiliary compartment for the combustion chamber of an engine wherein the auxiliary compartment communicates with an auxiliary intake valve, it will be appreciated that other arrangements of the auxiliary compartment within the engine combustion chamber may be utilized. For example, if desired, the article 10 of the present invention may be attached directly over the spark plug of a conventional engine having only a main intake valve for each combustion chamber, such that the interior region of the tubular portion 16 of the article 10 defines an auxiliary compartment surrounding only the spark plug of the invention. This may be accomplished by omitting the port 34 and auxiliary valve 33 of the embodiment of FIG. 1 and locating the igniting means in the position occupied by the auxiliary valve 33. In this latter arrangement the auxiliary compartment receives its charge through the aperture 24 in the closed end. If such an arrangement is utilized, it will be apparent that the second aperture 36 will be unnecessary since the spark plug will, in such a configuration, communicate directly with the open end of the article 10.

Modifications and variations of the present invention will be apparent to those having ordinary skill in the art and the invention is limited only by the following claims.

What is claimed is:

1. An article for use in defining an auxiliary compartment of the combustion chamber of an internal combustion engine, said article comprising:
   a. a tubular central heat receiving portion with one end open and the opposite end cupped;
   b. a mounting portion disposed adjacent said open end and extending in a direction generally outwardly from the wall of said central portion;
   c. at least one aperture formed in said cupped end for communicating the interior region of said central portion with the engine combustion chamber; and
   d. a heat output portion adjacent said cupped end and extending in a direction generally outwardly from the outer periphery of said central portion, said heat output portion having predetermined dimensions such that, upon attachment of said article in an engine combustion chamber by said mounting portion, said article expands during initial engine warm-up and said heat output portion contacts, initially spaced adjacent walls of the engine combustion chamber at a predetermined temperature with said central portion spaced from said adjacent chamber walls and said heat output portion remains in such contact at temperatures greater than said predetermined value for conducting heat only from the heat output portion of the cupped end of said article to the walls of the combustion chamber.

2. The article defined in claim 1, wherein said central portion, said mounting portion and said heat output portion are formed integrally of a material resistant to oxidation when exposed to combustion products at engine temperatures.

3. The article defined in claim 2 wherein said oxidation resistant material is a metal alloy.

4. The article defined in claim 3, wherein said metal alloy is selected from the group consisting of AISI type 300 series steel, or a chromium-nickel alloy.

5. The article defined in claim 1, wherein said predetermined temperature has a value not greater than 500° C.

6. The article defined in claim 1 wherein said heat output portion extends radially outwardly from the closed end of said central portion.

7. The article defined in claim 6, wherein said heat output portion includes a truncated conical surface for contacting the walls of engine combustion chamber.

8. The article defined in claim 6, wherein said heat output portion extends axially from said cupped end.

9. The article defined in claim 8, wherein said heat output portion includes a truncated conical surface for contacting the walls of engine combustion chamber.

10. The article defined in claim 1, wherein said end aperture includes a converging-diverging nozzle.

11. The article defined in claim 1, wherein said central portion has the wall thickness less than 3.0 mm.

12. The article defined in claim 1, wherein said central portion has the wall thereof convoluted.

13. The article defined in claim 1, wherein said central portion has a second aperture formed in the wall thereof for providing a passage for communicating the interior thereof with the means for igniting combustible mixture.

14. The article defined in claim 1, wherein said heat output portion has a generally annular configuration.

15. An article for defining an auxiliary compartment for the combustion chamber of an internal combustion engine, said article comprising:
   a. a tubular central heat-receiving portion with one end open and the opposite end cupped;
   b. a mounting portion disposed adjacent said open end and extending in a direction generally outwardly from the wall of said central portion;
   c. at least one aperture formed in the cupped end for communicating the interior region of said central portion with the engine combustion chamber;
   d. a heat output portion adjacent said cupped end and extending in a direction generally outwardly from the outer periphery of said tubular central, said heat output portion having predetermined dimensions such that, upon attachment of said article in an engine by said mounting portion, said heat output portion is initially spaced from contact with adjacent walls of the engine combustion chamber and, upon engine warm-up, said heat output portion expands to contact the adjacent combustion chamber walls to form a heat sink for conducting heat to said walls thereafter during continued engine operation with said heat receiving portion being spaced from said adjacent combustion chamber walls.

16. The article defined in claim 15, wherein said central portion, said mounting portion and said heat output portion are formed integrally of material resistant to oxidation when exposed to engine combustion products at engine operating temperatures.

17. The article defined in claim 16, wherein said oxidation resistant material is metal alloy.

18. The article defined in claim 17, wherein said material is one of the group consisting of AISI type 300 series steel or chrome-nickel alloy.

19. The article defined in claim 15, wherein said aperture includes a converging-diverging nozzle.

20. The article defined in claim 15, wherein said central portion has the wall thickness thereof less than 3.0 mm.

21. The article defined in claim 15, wherein said central portion has the wall thereof convoluted.

22. The article defined in claim 15, wherein said heat output portion is sized so as to produce a press-fit when said article is installed in the combustion chamber of an internal combustion engine.

23. The device defined in claim 15, wherein said central portion has a second aperture therein such that a passage is provided for communicating the interior thereof with the engine fuel igniter.

24. The article defined in claim 15, wherein said mounting portion extends radially outwardly from the central portion.

25. The article defined in claim 15, wherein said heat output portion has a generally annular configuration.

26. An article for use in defining an auxiliary compartment for the combustion chamber of an internal combustion engine, said article comprising:
  a. a tubular central heat receiving portion with one end opened and the opposite end cupped;
  b. a mounting portion disposed adjacent said open end;
  c. port means formed in the region of said cupped end for communicating the interior region of said central portion with the engine combustion chamber;
  d. a heat output portion adjacent said cupped end, said heat output portion having predetermined dimensions such that, upon attachment of said article in an engine combustion chamber by said mounting portion, said heat output portion is initially spaced from and expands to contact adjacent walls of the engine combustion chamber during initial engine warm-up and thereafter remains in such contact during continued engine operation, said heat receiving portion being spaced from said combustion chamber walls, and heat is conducted only from the said heat output portion of the cupped end of said article to the walls of the combustion chamber.

* * * * *